United States Patent [19]

Takada et al.

[11] Patent Number: 5,015,670

[45] Date of Patent: May 14, 1991

[54] POLYCARBONATE RESIN COMPOSITION

[75] Inventors: Toshiaki Takada; Tadami Kinugawa; Katsuhiro Yamaguchi; Kou Tanabe; Hiroyuki Nakano, all of Osaka, Japan

[73] Assignee: Mitsubishi Gas Chemical Company Ltd., Tokyo, Japan

[21] Appl. No.: 599,603

[22] Filed: Oct. 18, 1990

[30] Foreign Application Priority Data

Oct. 18, 1989 [JP] Japan ................................. 1-269036

[51] Int. Cl.$^5$ .............................................. C08L 69/00
[52] U.S. Cl. .................................... 523/214; 524/494; 524/847
[58] Field of Search ................ 523/214; 524/494, 847

[56] References Cited

U.S. PATENT DOCUMENTS 4,147,707  4/1979  Alewelt et al. ..................... 523/214

Primary Examiner—Paul R. Michl
Assistant Examiner—Peter Szekely
Attorney, Agent, or Firm—Sughrue, Mion, Zinn, Macpeak & Seas

[57] ABSTRACT

A glass-reinforced polycarbonate resin composition comprising an aromatic polycarbonate resin (a) and, blended therewith, 5 to 60% by weight based on the weight of the composition of a glass reinforcement (b) which has been treated with an acid.

The composition has excellent dimensional stability, mechanical strength, heat resistance and electrical characteristics, and is therefore used in industrial fields of cameras, VTR's, facsimiles and the like.

5 Claims, No Drawings

POLYCARBONATE RESIN COMPOSITION

FIELD OF THE INVENTION

The present invention relates to a glass-reinforced polycarbonate resin composition having improved stability. The composition of the present invention shows various excellent performances such as dimensional stability, mechanical strength, heat resistance, and electrical characteristics and, hence, can be advantageously used in many industrial fields such as cameras, VTR's, facsimiles, and the like.

BACKGROUND OF THE INVENTION

Conventionally, polycarbonate resin compositions containing glass reinforcements have various excellent performances. However, since the surface of glass reinforcements is normally alkaline, and sizing agents, etc., are adhered to the surface thereof, glass-reinforced polycarbonate resins have a problem that due to such glass reinforcements, the polycarbonate resins undergo hydrolysis and the like under heating and melting conditions to lower their molecular weight, resulting in deterioration of physical properties.

Therefore, a glass reinforcement which does not deteriorate polycarbonate resins at heating has been strongly desired.

SUMMARY OF THE INVENTION

The present inventors have conducted intensive studies to eliminate the above-described problem, and as a result, the present invention has been completed.

Accordingly, an object of the present invention is to provide a glass-reinforced polycarbonate resin composition having improved stability.

The glass-reinforced polycarbonate resin composition of the present invention comprises an aromatic polycarbonate resin (a) and, blended therewith, 5 to 60% by weight of a glass reinforcement (b) which has been treated with an acid.

In one preferred embodiment of the present invention, the glass reinforcement (b) is treated with an aqueous solution of phosphorous acid.

In another preferred embodiment, the glass reinforcement (b) is at least one glass reinforcement selected from the group consisting of fibers, solid spheres, hollow spheres, and flakes.

DETAILED DESCRIPTION OF THE INVENTION

The aromatic polycarbonate resin (a) used in the composition of the present invention is a resin prepared by the same method as employed to produce conventional polycarbonate resins, that is, the reaction of an aromatic dihydric phenol-type compound with phosgene or a carbonic acid diester. The aromatic polycarbonate resin, which is a homo- or copolymer, used to produce the composition of the present invention preferably has a viscosity-average molecular weight of from 19,000 to 30,000.

Examples of the aromatic dihydric phenol-type compound which can be used to produce the aromatic polycarbonate resin (a) include 2,2-bis(4-hydroxyphenyl)propane (i.e., bisphenol A), tetramethylbisphenol A, tetrabromobisphenol A, tetraethylbisphenol A, bis(4-hydroxyphenyl)methane, 1,1-bis(4-hydroxyphenyl)ethane, 2,2-bis(4-hydroxyphenyl)butane, 1,1-bis(4-hydroxyphenyl)cyclohexane, 1-phenyl-1,1-bis(4-hydroxyphenyl)ethane, bis(4-hydroxyphenyl)-p-diisopropylbenzene, and 4,4'-dihydroxyphenyl. Those may suitably be used alone or as a mixture of two or more thereof.

A molecular weight regulator may be used in the reaction of the aromatic dihydric phenol-type compound with phosgene or a carbonic acid diester to produce the aromatic polycarbonate resin, and monohydric phenol-type compounds which are conventionally used are also used in the present invention. Examples thereof include phenol; p-tert-butylphenol; tribromophenol; long chain alkyl-substituted phenols such as octylphenol, nonylphenol, and laurylphenol; long chain alkyl esters of hydroxybenzoic acid such as octyl hydroxybenzoate, lauryl hydroxybenzoate, and nonyl hydroxybenzoate; and (long chain alkyl)oxy-phenols such as octyl ether phenol (i.e., octyloxyphenol), nonyl ether phenol, and lauryl ether phenol. The amount of the molecular weight regulator used is in the range of from 1 to 10 mol %, preferably from 2.0 to 3.5 mol %, per mole of the dihydric phenol-type compound used.

The aromatic polycarbonate resin (a) may have a branched structure. Examples of a branching agent which can be used in the reaction of the dihydric phenol-type compound to produce such branched polycarbonate resin include polyhydroxy compounds such as phloroglucinol, 2,6-dimethyl-2,4,6-tri(4-hydroxyphenyl)heptene-3, 4,6-dimethyl-2,4,6-tri(4-hydroxyphenyl)heptene-2, 4,6-dimethyl-2,4,6-tri(4-hydroxyphenyl)heptane, 1,3,5-tri(4-hydroxyphenyl)benzene, and 1,1,1-tri(4-hydroxyphenyl)ethane, and further include 3,3-bis(4-hydroxyaryl)oxyindole (i.e., isatin bisphenol), 5-chloroisatin, 5,7-dichloroisatin, and 5-bromoisatin. The amount of the branching agent used is in the range of from 0.02 to 1.0 mol % per mole of the dihydric phenol-type compound used.

The glass reinforcement, component (b), used in the composition of the present invention is a glass which has been treated with an acid. Various kinds of reinforcing glasses in various forms can be used as component (b) after being subjected to acid treatment. Examples of the glass reinforcement include glass fibers having a diameter of 6 to 17 μm and a length of about 3 mm, milled glass fibers having a diameter of 6 to 9 μm and a length of about 70 μm, ultrafine glass fibers having a diameter of about 0.1 to 2 μm, and other various kinds of glass fibers; solid or hollow glass spheres such as glass beads having an average particle diameter of about 30 μm; an glass plates and other glass flakes produced by pulverization. Ordinary glass reinforcements are sized by using an aqueous solution of a sizing agent such as an epoxy resin, a urethane resin, an acrylic resin, or the like, or surface-treated with a silane coupling agent, a titanate coupling agent, or the like.

Acid treatment of the ordinary glass reinforcements as described above or untreated glass reinforcements for producing the acid-treated glass reinforcement used in the present invention can be conducted by, for example, immersing the glass reinforcement in an aqueous acid solution with a pH of 7 or less or spraying such an aqueous solution over the glass reinforcement, and then drying the glass reinforcement.

Examples of the acid used in acid treatment include phosphorous acid, boric acid, and the like, with phosphorous acid being particularly preferred. The acid treatment preferably comprises the steps of immersion in aqueous solution, filtration, and then drying.

The amount of the acid-treated glass reinforcement (b) added to the composition of the present invention is from 5 to 60% by weight, preferably from 10 to 50% by weight, based on the weight of the composition. A mixture of two or more glass reinforcements treated with acid can also be used. If the amount of the acid-treated glass reinforcement (b) added is below 5% by weight, the resulting composition has poor strength, stiffness, and dimensional stability. If the amount thereof exceeds 60% by weight, the flowability of the composition becomes poor to make molding of the composition difficult and, further, abrasion of molds and cylinders becomes severe, causing economic losses.

Other reinforcements and fillers can, of course, be used in combination with the above-described component (b), in order to improve the anisotropy and other properties of molded articles obtained from the composition. Such other reinforcements and fillers can be in the form of fibers, plates, flakes, or powder. Specific examples thereof include carbon fibers, silica, alumina, titanium oxide, calcium sulfate powder, gypsum, gypsum whiskers, barium sulfate, talc, mica, asbestos, calcium silicate, carbon black, graphite, iron powder, copper powder, molybdenum disulfide, silicon carbide, silicon carbide fibers, silicon nitride, silicon nitride fibers, brass fibers, stainless steel fibers, potassium titanate fibers, potassium titanate whiskers, and aromatic polyamide fibers.

The method for preparing the glass-reinforced polycarbonate resin composition of the present invention is not particularly limited, and a generally employed method for industrial preparation can suitably be used. For example, a method in which components (a) and (b) and other suitable additives are sufficiently mixed with each other by a mixing means such as a V-blender, and the resulting mixture is then formed into pellets by a single-screw vented extruder; or a method in which component (a) is mixed beforehand with other suitable additives by a powerful mixing means such as a super mixer, and the resulting mixture is then subjected to extrusion with a twin-screw vented extruder while component (b) is fed to the extruder in the course of extrusion, whereby the ingredients are mixed and formed into pellets, can be employed.

If desired and necessary, various additives may, of course, be added to the polycarbonate resin composition of the present invention. Such additives include lubricating agents such as fatty acid esters, paraffin wax, and silicone oil; internal plasticizers such as polyethylene, ABS, and poly(ethylene terephthalate); and other additives such as a heat stabilizer, an antioxidant, a UV stabilizer, a coloring material, and an antistatic agent.

As explained above and as will be demonstrated in the following Examples and Comparative Examples, the composition of the present invention has excellent heat resistance and heat stability and also has excellent mechanical strength. Therefore, the composition of the present invention can be advantageously used as a molding material in the field of precision machines such as cameras, VTR's and facsimiles.

The present invention will be described in more detail by reference to the following Examples and Comparative Examples, which should not be construed to be limiting the scope of the invention. All percent, parts, ratios and the like are by weight unless otherwise indicated.

EXAMPLES 1 AND 2 AND COMPARATIVE EXAMPLES 1 AND 2

Glass fibers (manufactured by Asahi Fiber Glass Co., Ltd., Japan; trade name, Glasron Chopped Strand; hereinafter referred to as "GF") pretreated with a silane coupling agent and a urethane-type sizing agent were immersed in an aqueous phosphorous acid solution having a pH of 3–5 at 60° C. for 15 minutes. The aqueous solution was then removed and the GF was dried to obtain acid-treated GF (hereinafter referred to as "P-GF").

The above-obtained P-GF was mixed with a bisphenol A polycarbonate resin powder (manufactured by Mitsubishi Gas Chemical Company, Inc., Japan; trade name, Iupilon S-2000; viscosity-average molecular weight 25,000; hereinafter referred to as "PC") in proportions shown in Table 1. Each of the resulting mixtures was stirred with a tumbler and then extruded into pellets by a single-screw vented extruder.

The pellets obtained above were dried at 120° C. for 5 hours in a circulating air oven, and then formed into test pieces by injection molding.

The thus-obtained molded test pieces were evaluated for strength and molecular weight. The results obtained are shown in Table 1.

For the purpose of comparison, test pieces were prepared and evaluated in the same manner as above except that the GF which had not been subjected to acid treatment was used in place of the P-GF. The results obtained are shown in Table 1.

TABLE 1

| | Components | | Molecular Weight | | Flexural strength (kg/cm$^2$) |
|---|---|---|---|---|---|
| | PC (parts) | Glass (parts) | Pellet ($\times 10^4$) | Molded test piece ($\times 10^4$) | |
| Example 1 | 70 | P-GF 30 | 2.2 | 2.1 | 1,800 |
| Comparative Example 1 | 70 | GF 30 | 2.2 | 2.0 | 1,850 |
| Example 2 | 50 | P-GF 50 | 2.1 | 2.0 | 1,980 |
| Comparative Example 2 | 50 | GF 50 | 2.0 | 1.8 | 2,000 |

The results shown in Table 1 above show that use of the acid-treated glass fiber can prevent decrease in the molecular weight of the molded test piece prepared from pellets, in comparison with use of acid-untreated glass fiber, and achieve the flexural strength comparable with that in use of acid-untreated glass fiber.

EXAMPLE 3 AND COMPARATIVE EXAMPLE 3

Surface-untreated milled glass fibers (manufactured by Nippon Electric Glass Co., Ltd., Japan; trade name, Milled Fiber EPG; hereinafter referred to as "MF") were immersed in aqueous phosphorous acid solution having a pH of 3–5 at 60° C. for 15 minutes. The aqueous solution was then removed and the MF was dried to obtain acid-treated MF (hereinafter referred to as "P-MF").

Test pieces were prepared and evaluated in the same manner as in Example 1 except that the above-obtained P-MF (Example 3) or the MF (Comparative Example 3) was used in place of the P-GF. In addition, test pieces were prepared likewise from the above two compositions by injection molding except that the compositions were molded after retention of the same in the cylinder of the injection molding machine at a cylinder temperature of 320° C. The test pieces thus obtained are also evaluated for strength and molecular weight. The results obtained are shown in Table 2.

EXAMPLE 4 AND COMPARATIVE EXAMPLE 4

Glass beads (manufactured by Toshiba Ballotini Co., Ltd., Japan; trade name, EGB; hereinafter referred to as "GB") were immersed in aqueous phosphorous acid solution having a pH of 3-5 at 60° C. for 15 minutes. The aqueous solution was then removed and the GB was dried to obtain acid-treated GB (hereinafter referred to as "P-GB").

Test pieces were prepared and evaluated in the same manner as in Example 1 except that the above-obtained P-GB (Example 4) or the GB (Comparative Example 4) was used in place of the P-GF. The results obtained are shown in Table 2.

TABLE 2

|  | Example 3 | Comparative Example 3 | Example 4 | Comparative Example 4 |
| --- | --- | --- | --- | --- |
| Components (parts) | | | | |
| PC | 70 | 70 | 80 | 80 |
| P-MF | 30 | | | |
| MF | | 30 | | |
| P-GB | | | 20 | |
| GB | | | | 20 |
| Molecular weight ($\times 10^4$) | | | | |
| Pellet | 2.2 | 2.1 | 2.2 | 2.0 |
| Molded test piece | 2.1 | 1.9 | 2.1 | 1.8 |
| Flexural strength ($kg/cm^2$) | — | — | 910 | 900 |
| Molding after retention | | | | |
| 320° C., 6 min | | | | |
| Molecular weight ($\times 10^4$) | 2.1 | 1.5 | — | — |
| 320° C., 10 min | | | | |
| Molecular weight ($\times 10^4$) | 1.8 | 1.3 | — | — |
| Flexural strength ($kg/cm^2$) | 1,000 | 850 | — | — |

In Table 2, "—" means no measurement

From the comparison between Example 3 and Comparative Example 3 shown in Table 2 above, it is apparent that use of the acid-treated glass fiber can effectively prevent decrease in the molecular weight and the flexural strength in molding after retension, in comparison with use of the acid-untreated glass fiber.

From the comparison between Example 4 and Comparative Example 4, it is apparent that use of the acid-treated glass fiber prevents decrease in the molecular weight of the molded text piece, as compared with use of the acid-untreated glass fiber.

While the invention has been described in detail and with reference to specific embodiments thereof, it will be apparent to one skilled in the art that various changes and modifications can be made therein without departing from the spirit and scope thereof.

What is claimed is:

1. A glass-reinforced polycarbonate resin composition comprising an aromatic polycarbonate resin (a) and, blended therewith, 5 to 60% by weight based on the weight of the composition of a glass reinforcement (b) which has been treated with an acid.

2. A polycarbonate resin composition as claimed in claim 1, wherein the acid used for the acid treatment is an aqueous solution of phosphorous acid.

3. A polycarbonate resin composition as claimed in claim 1, wherein said glass reinforcement (b) is at least one glass reinforcement selected from the group consisting of fibers, solid spheres, hollow spheres, and flakes.

4. A polycarbonate resin composition as claimed in claim 1, wherein the aromatic polycarbonate resin (a) has a viscosity-average molecular weight of 19,000 to 30,000.

5. A polycarbonate resin composition as claimed in claim 1, wherein the amount of the glass reinforcement (b) is 10 to 50% by weight based on the weight of the composition.

* * * * *